Oct. 27, 1964
C. J. HELTZEL
3,154,202
MOBILE BATCHING PLANT
Filed May 29, 1963
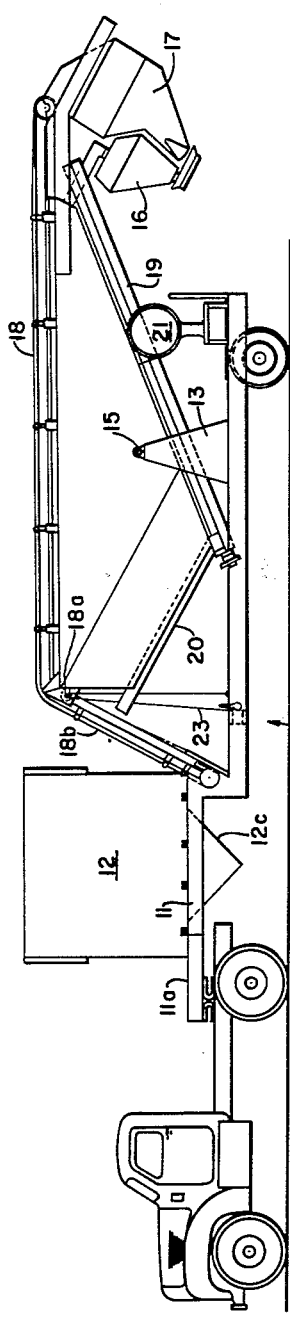
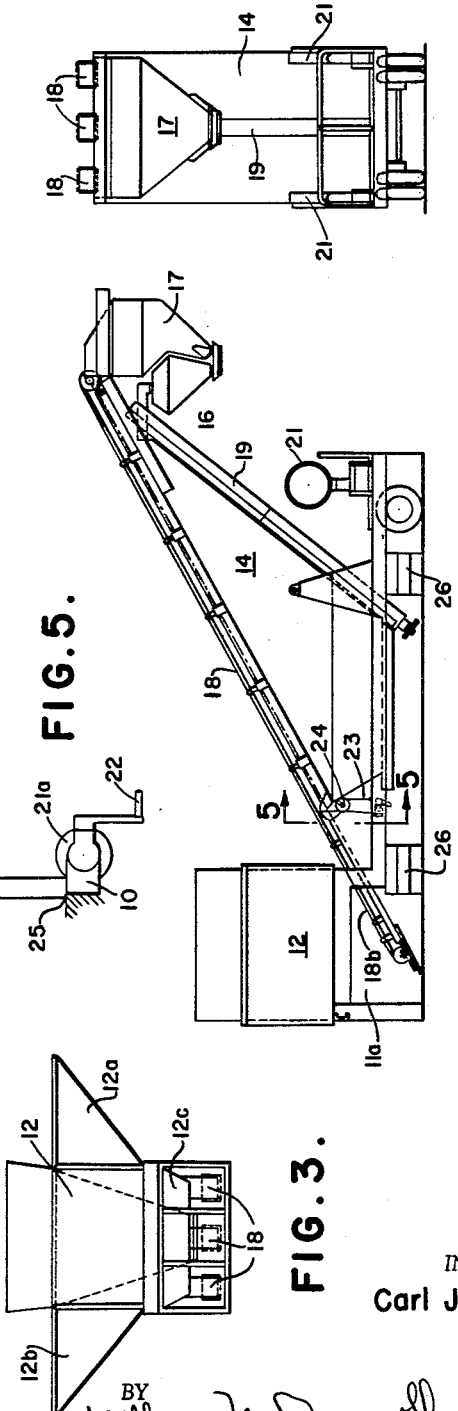
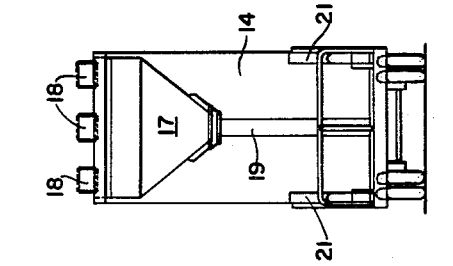
INVENTOR
Carl J. Heltzel
BY Wilkinson, Mawhinney & Theibautt
ATTORNEYS United States Patent Office 3,154,202
Patented Oct. 27, 1964

1

3,154,202
MOBILE BATCHING PLANT
Carl J. Heltzel, 523 Country Club Drive, Warren, Ohio
Filed May 29, 1963, Ser. No. 284,039
8 Claims. (Cl. 214—17)

The present invention relates to a mobile batching plant and is an improvement over the Mobile Batching Plant shown and described in United States Letters Patent 3,064,832, granted November 20, 1962, in that the plant of the instant invention is of a more compact physical nature and of a consequently lesser capacity in cubic yards per hour batching capacity.

Another object of the present invention is the provision on a single transportation rig of both the cement bin, aggregate conveyor, weigh hoppers and aggregate hoppers. As shown in the identified Letters Patent, two units were required for setting up operation in the field whereas the instant invention is a single complete compact self-contained unit.

A further object of the present invention is the provision of the aggregate bins located at the front end of the transportation rig whereby the side walls for storing the aggregate may be reduced to minimum transportation width when moving the plant from one site to another.

A still further object of the present invention is the fact that the plant of the instant invention may be taken from a transportation position to an erected on-the-site operating position in one-and-one-half hours. The frame carrying the cement bin and aggregate storage bins is equipped with a standard fifth wheel kingpin for coupling to a tractor and which may be towed as a semi-trailer.

Another object of the present invention is to provide a self-contained mobile batching plant which may be hand powered from a transportation position to an erected plant at a job site position.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is a side elevational view of the unit constructed in accordance with the present invention in a transport position shown coupled to a tractor for moving the unit from one site to another.

FIGURE 2 is a side elevational view showing the unit of the present invention in its erected on-the-site batch plant operating position.

FIGURE 3 is a transverse section taken through a portion of the forward end of the unit showing the aggregate bin and aggregate discharge areas.

FIGURE 4 is a rear elevational view of the plant in the erected position.

FIGURE 5 is an enlarged view taken on the line 5—5 in FIGURE 2.

Referring more particularly to the drawings and for the moment to FIGURE 1, 10 designates a bed frame generally of rectangular configuration but lying in two horizontal planes, the upper plane portion 11 for purposes of supporting a multiple compartment aggregate bin 12. The lower portion of the frame 10 is provided with pivotal support members 13 to which is pivoted and supported a cement storage bin 14, as at 15. The cement storage bin 14 has the same geometric configuration as the cement storage bin in United States Letters Patent 3,064,832, granted November 20, 1962.

The batching hoppers are hung in the usual manner at the rear of the cement bin 14 and are identified as cement batcher 16 and aggregate batcher 17. The aggregate batcher 17 is charged with aggregate from two or more conveyors 18 supported on the long side of the cement storage bin which might best be defined as a pentahedron.

The cement hopper 16 is charged through an inclined screw conveyor tube 19. Located intermediate the cement batching hopper and the inclined screw conveyor tube 19 as a horizontal conveyor 20. At the bottom of the cement storage bin in the erected position the inclined screw conveyor receives cement from a horizontal conveyor tube.

The cement and aggregate batchers 16 and 17 may be suspended, as illustrated in the above-identified patent, for tying to weighing scales 21.

The forward end of the transport unit 11 supports the aggregate storage bin 12 which has side members 12$^a$, 12$^b$, which may in the plant erected position be flared outwardly beyond the base dimension of the aggregate bin to thereby increase the capacity thereof depending upon whether or not the bin is a split bin or multiple compartment bin which is also dependent upon whether two or more conveyors 18 are employed.

The aggregate bin 12 is positioned on the transportation base frame with the major axis of the aggregate bin 12 transversely of or normal to the longitudinal axis of the plant support 10 and transport unit.

The forward end of the conveyor 18 is pivoted at 18$^a$ and defines a short run 18$^b$ which in the erected position is placed in alignment with the main run of the conveyor 18 with the leading end 18$^c$ in registry with the discharge gates 12$^c$ of the aggregate bin.

The plant can be equipped with either a hydraulic cylinder, as shown in the above-identified patent, that will act as a pushing ram to rock the plant about its pivot 15 and elevate the cement and aggregate batching hoppers to the batching position, or the plant may be furnished with a hand- or power-operated winch and through a system of sheaves and cables may be pulled to an erected position, as shown in FIGURE 2.

The unit is elevated from the position of FIGURE 1 to the position of FIGURE 2 by operation of a hand winch 21$^a$ having a cranking handle 22 which winds in a cable 23 which is roved about a three sheave snatch block 24 carried by the cement bin 14, the other end of cable 23 being anchored to the mobile rectangular frame 10 at 25 whereby upon rotation of the hand crank 22 the cement bin is rocked about pivot 15 causing it to travel from the position of FIGURE 1 to the job site position of FIGURE 2.

The forward portion 11$^a$ of the upper level of the mobile frame 10 which carries the fifth wheel of the towing vehicle at the on-site position rocks about a pivot and forms a supporting leg for the cement storage bin, as shown in FIGURE 2. Suitable load blocks 26 are inserted prior to the commencement of batching operations.

When preparing the batch plant for transport the side plates 12$^a$ and 12$^b$ are placed in a flat position so that the vehicle has no greater width than the rectangular base frame 10 for over-the-highway transport and the cement storage bin is in its down position with its long side parallel to the base of the frame unit 10 with the aggregate conveyors 18 also parallel to the base frame of the unit 10.

When the vehicle is moved into position the blocks 26 are put in place, the pivoted leading end 11$^a$ of the upper portion of the main frame is dropped to the position of FIGURE 2 to form a support for the aggregate bins 12. The aggregate bins 12 are then charged, that is by example, with a front end loader. The forward portion of the aggregate conveyors 18$^b$ is erected from the bent position of FIGURE 1 to the in-line position of FIGURE 2, that is, in line with the major run of the aggregate conveyors 18 and in registry with the mouths of the aggregate bin discharge gates 12$^c$.

The plant operator may then energize the motor-driven conveyor belt 18 to deliver aggregate to the aggregate hopper 17 while simultaneously energizing the cement charging tube 19 and 20 to deliver the cement to the cement hopper 16.

When the proper weights are determined on the scale 21 both batches are discharged and the material is discharged either into a ready mix type truck or into a dry batch truck for further transport to the job.

When it is desired to remove the plant from one location to another the fifth wheel connection 11ᵃ is pivoted to the horizontal position of FIGURE 1 and the tractor is backed in and connected, the blocks 26 are removed and the winch 21ᵃ pays out the cable 23 allowing the unit to descend from the position of FIGURE 2 to the position of FIGURE 1 and the unit is then transported to the new job site.

Although I have disclosed herein the best form of the invention known to me at this time, I reserve the right to all such modifications and changes as may come within the scope of the following claims.

What is claimed is:

1. A mobile batching plant comprising
    (a) an elongated rectangular base frame having means by which it may be moved from one site to another,
    (b) a rocker unit mounted on said base frame,
    (c) a cement storage bin of varying depth having its greatest depth at approximately the pivot point of the rocker unit and being carried by said rocker unit,
    (d) aggregate conveyor means carried by said unit in a generally horizontal position for transport and movable to an inclined position when the unit is erected,
    (e) cement conveyor means on said unit in communication with the storage bin,
    (f) cement and aggregate batchers supported on and movable with the unit in position to receive cement and aggregate from the conveyor means by gravity flow when the plant is in the erect position, and
    (g) aggregate storage bin means carried by said rectangular base frame with the major axis of the bin normal to the longitudinal axis of the base frame unit and with the discharge mouths of the aggregate bins adapted to be in registry with the aggregate conveyors when the cement storage bin and aggregate conveyors are in the plant erect position.

2. A mobile batching plant as claimed in claim 1 further comprising
    (a) hand winch elevating means connected between the base frame unit and the cement storage bin forwardly of the cement storage bin's pivotal connection to the base frame for causing the plant to be erected at the batching site, the hand winch elevating means being connected to the cement storage bin at the point thereof which is most forwardly remote from said pivotal connection.

3. A mobile batching plant as claimed in claim 1 wherein said
    (a) aggregate bin means is provided with walls pivotally connected to the side walls of said aggregate bins for enlarging the bin capacity area along the major axis of the bin at the job erected site.

4. A mobile unitary complete compact self-contained batching plant comprising
    (a) an elongated rectangular base frame adapted to be moved from one site to another,
    (b) a rocker unit mounted on said base frame,
    (c) a cement storage bin pivotally mounted on the rocker unit,
    (d) aggregate conveyor means carried by said unit in a generally horizontal position for transport and movable to an inclined position when the unit is erected,
    (e) cement conveyor means on said unit in communication with the storage bin,
    (f) cement and aggregate batchers supported on and movable with the unit in position to receive cement and aggregate from the conveyor means by gravity flow when the plant is in the erect position, and
    (g) aggregate storage bin means carried by said rectangular base frame with the major axis of the bin normal to the longitudinal axis of the base frame and with the discharge mouths of the aggregate bin means adapted to be in registry with the aggregate conveyors when the cement storage bin means and aggregate conveyor means are in the plant erect position.

5. A batching plant as claimed in claim 4, wherein the forward end portion of the aggregate conveyor means is pivotally connected to the remainder of the aggregate conveyor means so that said forward end portion is inclined downwardly substantially normal to the longitudinal axis of said base frame rearwardly of the forward end portion of the base frame, said aggregate storage bin means being disposed forwardly of said forward end portion of the aggregate conveyor means on the forward end portion of the base frame.

6. A batching plant as claimed in claim 5, wherein the forward end portion of the base frame comprises a pivotally connected forward end part adapted to be moved downwardly to a substantially vertical position to support the forward end portion of the base frame and the aggregate bin means when the plant is in its erected batching position.

7. A mobile unitary complete compact self-contained batching plant comprising
    (a) mobile supporting means,
    (b) a cement storage bin carried by said supporting means,
    (c) aggregate conveyor means carried by said supporting means in a generally horizontal position for transport and movable to an inclined position when the plant is erected for a batching operation,
    (d) cement conveyor means carried by said supporting means in communication with the storage bin,
    (e) cement and aggregate batchers supported on and movable with the supporting means in position to receive cement and aggregate from the conveyor means by gravity flow when the plant is in the erected position,
    (f) aggregate storage bin means carried by said supporting means with the major axis of the bin normal to the longitudinal axis of the supporting means and with the discharge mouths of the aggregate bin means adapted to be in registry with the aggregate conveyors when the cement storage bin means and aggregate conveyor means are in the plant erect position,
    (g) pivotal support means on said supporting means for pivotally mounting said cement storage bin, said conveyor means and said batchers in balanced relation to one another to permit facile pivotal movement of said cement storage bin, said conveyor means and said batchers between the transport position of the plant and the erect batching position of the plant, and
    (h) manually operable means for effecting said pivotal movement of the bin, the conveyor means and the batchers.

8. A mobile batching plant comprising
    (a) an elongated mobile supporting frame adapted to be moved from one site to another,
    (b) a cement storage bin carried by said supporting frame,
    (c) an aggregate storage bin carried by said supporting frame,
    (d) a weight cement batching hopper carried by said supporting frame,
    (e) cement conveyor means carried by said supporting frame in communication with said cement storage bin for delivering cement to the cement batching hopper,
    (f) a weight aggregate batcher hopper carried by said supporting frame,
    (g) aggregate conveyor means carried by said supporting frame in communication with said aggregate storage bin for delivering aggregate to the aggregate batcher hopper, and (h) means carried by said supporting frame for receiving the cement and the aggregate from the cement batching hopper and the aggregate batching hopper when a predetermined weight of the cement and aggregate have been delivered to said hoppers.

References Cited by the Examiner
UNITED STATES PATENTS

| | | |
|---|---|---|
| 1,715,853 | 6/29 | Madsen. |
| 2,873,036 | 2/59 | Noble _____ 214—2 |
| 3,064,832 | 11/62 | Heltzel _____ 214—17 |

HUGO O. SCHULZ, *Primary Examiner*.